(12) United States Patent
Tezuka et al.

(10) Patent No.: US 9,897,106 B2
(45) Date of Patent: Feb. 20, 2018

(54) ROTARY MACHINE SUPPORT DEVICE

(71) Applicant: IHI Corporation, Koto-ku (JP)

(72) Inventors: Atsushi Tezuka, Tokyo (JP); Kenkichi Murata, Tokyo (JP); Tatsuya Fukui, Tokyo (JP); Masanori Okada, Tokyo (JP); Fumiaki Ogino, Tokyo (JP)

(73) Assignee: IHI Corporation, Koto-ku (JP)

( * ) Notice: Subject to any disclaimer, the term of this patent is extended or adjusted under 35 U.S.C. 154(b) by 353 days.

(21) Appl. No.: 14/833,474

(22) Filed: Aug. 24, 2015

(65) Prior Publication Data

US 2015/0361992 A1    Dec. 17, 2015

Related U.S. Application Data

(63) Continuation of application No. PCT/JP2014/055254, filed on Mar. 3, 2014.

(30) Foreign Application Priority Data

Mar. 18, 2013    (JP) .................................. 2013-055340

(51) Int. Cl.
*F04D 29/62* (2006.01)
*G01M 1/04* (2006.01)
(Continued)

(52) U.S. Cl.
CPC ........... *F04D 29/624* (2013.01); *F01D 5/027* (2013.01); *F01D 21/003* (2013.01);
(Continued)

(58) Field of Classification Search
CPC ...... F04D 29/624; F04D 17/10; F04D 25/024; F04D 29/053; F04D 29/056;
(Continued)

(56) References Cited

U.S. PATENT DOCUMENTS

| 5,703,291 A | 12/1997 | Rossteuscher |
| 2005/0262841 A1* | 12/2005 | Parker .................... F01D 17/14 60/602 |

(Continued)

FOREIGN PATENT DOCUMENTS

| CN | 1894572 A | 1/2007 |
| CN | 101144745 A | 3/2008 |

(Continued)

OTHER PUBLICATIONS

International Search Report dated Apr. 1, 2014 for PCT/JP2014/052254 filed on Mar. 3, 2014 with English Translation.

(Continued)

*Primary Examiner* — Aaron R Eastman
(74) *Attorney, Agent, or Firm* — Oblon, McClelland, Maier & Neustadt, L.L.P.

(57) ABSTRACT

A rotary machine support device is used for supporting a rotary machine including a hearing housing with a flange and a rotary shaft. The rotary machine support device includes a support portion which supports the rotary machine. The support portion includes: a mounting flange capable of contacting the flange; and arms, each arm including a holding portion which holds the mounting flange and the flange together while pressing the flanges contacting each other inward from outside in the radial direction thereof. The holding portion includes a pair of claw pieces. In addition, at least one of the mounting flange and a groove portion formed between the pair of claw pieces is formed in a tapered shape, and the tapered shape is formed so that the width thereof in the opposing direction of the flange and the mounting flange gradually decreases outward from inside in the radial direction.

4 Claims, 8 Drawing Sheets

(51) Int. Cl.
*F04D 17/10* (2006.01)
*F04D 29/053* (2006.01)
*F04D 29/056* (2006.01)
*F04D 29/42* (2006.01)
*F04D 25/02* (2006.01)
*F01D 5/02* (2006.01)
*F01D 21/00* (2006.01)
*F01D 25/28* (2006.01)
*F01D 25/16* (2006.01)
*F01D 25/24* (2006.01)
*F04D 29/66* (2006.01)

(52) U.S. Cl.
CPC ......... *F01D 25/162* (2013.01); *F01D 25/243* (2013.01); *F01D 25/285* (2013.01); *F04D 17/10* (2013.01); *F04D 25/024* (2013.01); *F04D 29/053* (2013.01); *F04D 29/056* (2013.01); *F04D 29/0563* (2013.01); *F04D 29/4206* (2013.01); *F04D 29/662* (2013.01); *G01M 1/04* (2013.01); *F05D 2220/40* (2013.01); *F05D 2260/37* (2013.01); *F05D 2260/39* (2013.01)

(58) Field of Classification Search
CPC ............. F04D 29/0563; F04D 29/4206; F04D 29/662; F04D 15/0088; F04D 27/001; F01D 5/027; F01D 21/003; F01D 25/162; F01D 25/243; F01D 25/285; F05D 2220/40; F05D 2260/37; F05D 2260/39; F05D 2260/12; F05D 2260/83; G01M 1/04
USPC ........................ 415/214.1, 16; 416/61, 244 R
See application file for complete search history.

(56) References Cited

U.S. PATENT DOCUMENTS

| | | | |
|---|---|---|---|
| 2006/0010864 A1* | 1/2006 | Mulloy | F01D 17/143 60/602 |
| 2006/0037317 A1* | 2/2006 | Leavesley | F01D 17/167 60/602 |
| 2008/0060434 A1 | 3/2008 | Kershaw | |
| 2008/0282782 A1 | 11/2008 | Mitsubori et al. | |
| 2010/0129221 A1 | 5/2010 | Huxley-Reynard et al. | |
| 2010/0191380 A1 | 7/2010 | Maeda | |
| 2010/0269588 A1 | 10/2010 | Thelen et al. | |
| 2010/0296925 A1* | 11/2010 | Sakai | F01D 25/243 415/214.1 |
| 2014/0178119 A1 | 6/2014 | Shinohara et al. | |

FOREIGN PATENT DOCUMENTS

| | | |
|---|---|---|
| CN | 101688816 A | 3/2010 |
| CN | 101836098 A | 9/2010 |
| CN | 202188937 U | 4/2012 |
| EP | 2 172 758 A1 | 4/2010 |
| JP | 2009-216527 A | 9/2009 |
| JP | 2010-025862 A | 2/2010 |
| JP | 2013-44583 A | 3/2013 |
| WO | WO 2013/021515 A1 | 2/2013 |

OTHER PUBLICATIONS

Kun-hao Wan, et al., "Fault Research of Turbo Supercharger Rotor Mass Imbalance", Science Technology and Engineering, vol. 9, No. 24, Dec. 2009, pp. 7474-7478 (with English Abstract).

* cited by examiner

ROTARY MACHINE SUPPORT DEVICE

TECHNICAL FIELD

The present disclosure relates to a rotary machine support device. This application is a Continuation Application based on International Application No. PCT/JP2014/055254, filed Mar. 3, 2014, which claims priority on Japanese Patent Application No. 2013-055340, filed Mar. 18, 2013, the contents of both of which are incorporated herein by reference.

BACKGROUND ART

In the related art, in a rotary machine which is rotationally driven by, for example, fluid, an unbalanced amount remaining in a rotary unit is detected, the remaining unbalanced amount is corrected if it is large, and thereafter an end product thereof is shipped. The rotary machine includes a turbocharger, a turbo compressor, a gas turbine or the like. The rotation balance correction on, for example, the turbocharger in the related art is described.

The turbocharger is a device which supplies compressed air to a combustion engine using exhaust gas energy of the engine mounted on a vehicle, a ship or the like.

The turbocharger includes a turbine blade which is rotationally driven by exhaust gas of the engine, a compressor blade which compresses air by rotating integrally with the turbine blade and supplies compressed air to the engine, and a rotary shaft in which one end part thereof is connected with the turbine blade and the other end part thereof is connected with the compressor blade. In addition, the turbocharger includes a turbine housing internally accommodating the turbine blade, a compressor housing internally accommodating the compressor blade, and a hearing housing in which a hearing supporting the rotary shaft is incorporated.

The rotation balance inspection on a turbocharger is performed before the turbocharger is shipped as a product.

In the rotation balance inspection, first, a rotary unit, in which a rotor composed of the turbine blade, the compressor blade and the rotary shaft is attached to the hearing housing, is prepared. Next, a portion of the rotary unit (the hearing housing) close to the turbine blade is mounted on a rotary machine support device using bolts or the like and is supported thereby. Thereafter, compressed gas having approximately the same pressure as that of the exhaust gas of the engine is supplied to the turbine blade, and thereby the rotor composed of the turbine blade, the compressor blade and the rotary shaft is rotationally driven.

When the rotation speed of the rotor reaches a predetermined rotation speed, a rotation angle detector detects a rotation angle of the rotor while an acceleration pickup detects an acceleration (vibration) of the rotor. In this way, for example, a calculator detects how much acceleration (vibration) occurs at every rotation angle and at the predetermined rotation speed. Based on the detected data, the unbalanced amount is determined. Thereafter, the balance correction is performed by machining the rotor so that a part of the rotor is removed and the unbalanced amount is eliminated.

In the rotation balance inspection on the turbocharger (the rotary machine), a configuration of the rotary machine support device used to support the turbocharger is known in which a pressing member presses a flange of the bearing housing of the turbocharger, namely the flange of the bearing housing to which the turbine housing is attached, against a support portion arranged on the side of the bearing housing opposite to the compressor housing, and the turbocharger serving as an inspection target is held and fixed thereto (for example, refer to Patent Document 1).

DOCUMENT OF RELATED ART

Patent Document

[Patent Document 1] Japanese Unexamined Patent Application, First Publication No. 2010-25862

SUMMARY

Technical Problem

In general, the turbocharger has a projection which is formed in the vicinity of the flange of the bearing housing and to which a supply pipe or the like of cooling water or of lubricating oil is connected. Therefore, in the rotary machine support device as shown in Patent Document 1, the position of the pressing member is designed so that when the pressing member presses (pressurizes) the flange of the bearing housing of the turbocharger, the pressing member does not contact the projection and can press the flange in a state apart from the projection.

However, since the positions of projections vary in accordance with models of turbocharge, a rotary machine support device cannot hold and fix some models of turbocharger due to the designed position of the pressing member thereof. Therefore, in the related art, in order to perform the rotation balance inspection, it is necessary to prepare several kinds of rotary machine support device in accordance with models of turbocharger. Moreover, if a new model of turbocharger is manufactured, a new rotary machine support device accepting the new model may have to he prepared. However, the preparation of several kinds of rotary machine support device in this way causes the increase in cost. In addition, it is difficult to secure storage areas for the rotary machine support devices. Furthermore, these circumstances also cause the deterioration in easiness of the inspection.

The present disclosure is made in view of the above circumstances, and an object thereof is to provide a rotary machine support device which can be used for all models of rotary machine without depending on the position of a projection or the like of the rotary machine, in order to limit the increase in cost and to simplify the inspection.

Solution to Problem

A first aspect of the present disclosure is a rotary machine support device used for supporting a rotary machine which includes a bearing housing and a rotary shaft, the bearing housing including a flange formed outward, the rotary shaft being rotatably held inside the bearing housing. The rotary machine support device includes a support portion which supports the rotary machine. The support portion includes: a mounting flange capable of contacting the flange of the rotary machine; and a plurality of arms, each arm including a holding portion which is configured to hold the mounting flange and the flange together while pressing the mounting flange and the flange inward from outside in the radial direction of the mounting flange in a state where the mounting flange contacts the flange. The holding portion includes a pair of claw pieces which face each other and which are capable of holding the mounting flange and the flange together. In addition, at least one of the mounting flange and a groove portion which is formed between the pair of claw pieces is formed in a tapered shape, and the tapered shape is formed so that the width of the tapered shape in the opposing direction of the flange and the mounting flange gradually decreases outward from inside in the radial direction of the mounting flange.

A second aspect of the present disclosure is that in the rotary machine support device of the first aspect, the holding portion is provided on an end of the arm so that the position of the holding portion is capable of changing in each of a direction around an axis of the arm, a direction orthogonal to the opposing direction, and the opposing direction.

A third aspect of the present disclosure is that in the rotary machine support device of the first or second aspect, the arm includes an advancing and retracting mechanism having a cylinder portion and a piston portion capable of advancing and retracting inside the cylinder portion. The piston portion includes an outer cylindrical portion having a cylindrical shape with a bottom, and a piston arm inserted in the outer cylindrical portion. The piston arm, in which a gap is formed between an end part of the piston arm and an inner surface of the outer cylindrical portion, is configured to be resiliently deformable. In addition, an end of the piston arm is provided with the pair of claw pieces.

Effects

A rotary machine support device of the present disclosure includes a holding portion having a pair of claw pieces which face each other and hold a mounting flange and a flange of a rotary machine together, and at least one of the mounting flange and a groove portion formed between the pair of claw pieces is formed in a tapered shape. Therefore, the holding portion holds the mounting flange and the flange together while the holding portion presses the flanges inward from outside in the radial direction thereof in a state where the mounting flange contacts the flange, and thereby a pressing force of the holding portion inward from outside thereof in the radial direction can be changed into a pressing force in the opposing direction of the mounting flange and the flange through the tapered shape. Thus, the flange of the rotary machine can be brought into close contact with the mounting flange of a support portion.

In addition, even if various kinds of projection is formed in the vicinity of the flange of the rotary machine, since the holding portion of the rotary machine support device holds the flange of the rotary machine together with the mounting flange, the holding using the holding portion is not interfered by the projection. Thus, even if the projection is provided on any position, all models of rotary machine can be accepted and supported thereby without reference to the position of the projection. Consequently, it is possible to limit the increase in cost of the rotation balance inspection and to simplify the inspection.

DESCRIPTION OF EMBODIMENTS

Hereinafter, a rotary machine support device of the present disclosure is described in detail with reference to the drawings. In the following drawings, the scale of each member is appropriately changed so that each member has a recognizable size.

Figure 1A:
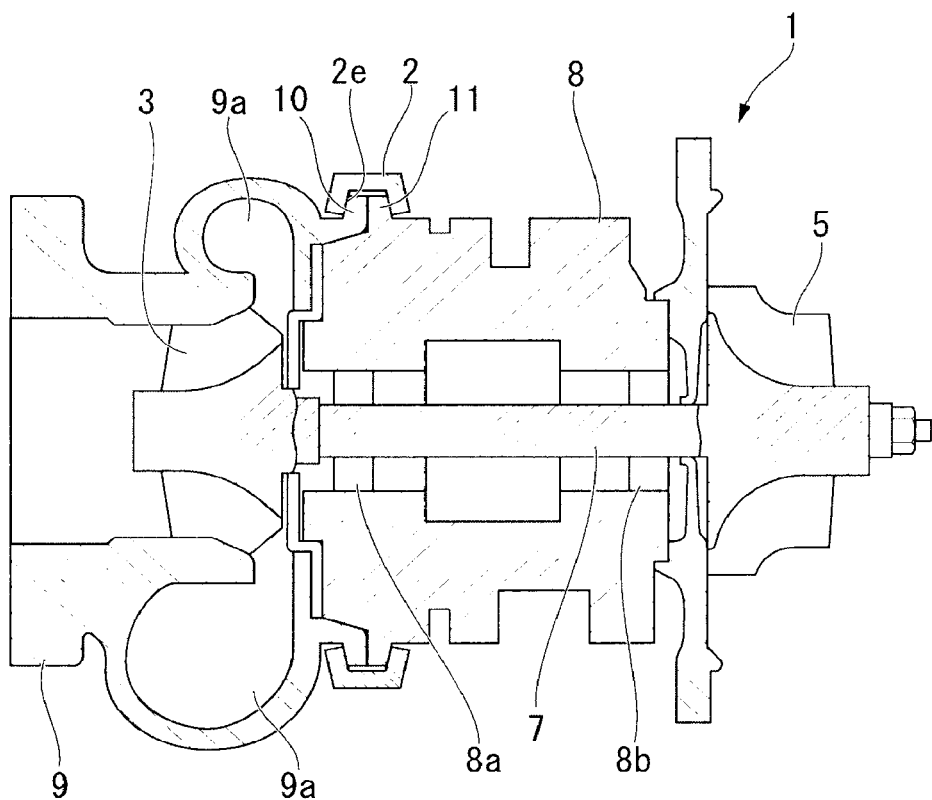
FIG. 1A is a cross-sectional side view showing a configuration of a turbocharger which is supported by a rotary machine support device of an embodiment.
Figure 1B:
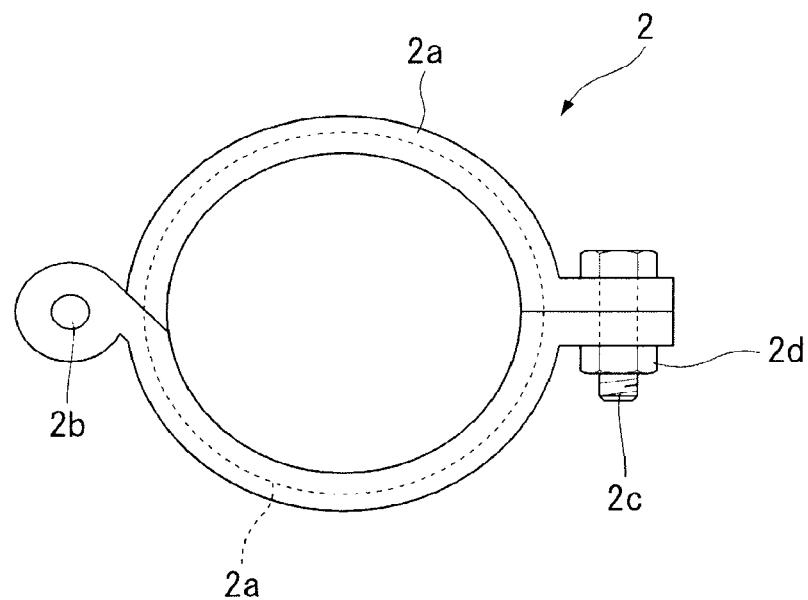
FIG. 1B is a schematic configuration diagram of a coupling member shown in the rotation axis direction of the turbocharger.

First, an example of a rotary machine which is supported by a rotary machine support device of the present disclosure is described. FIG. 1A is a cross-sectional side view showing a turbocharger which is an example of the rotary machine, and FIG. 1B is a schematic configuration diagram of a coupling member shown in the rotation axis direction of the turbocharger.

As shown in FIG. 1A, a turbocharger 1 includes a turbine blade 3 which is rotationally driven by exhaust gas of a combustion engine, a compressor blade 5 which compresses air by rotating integrally with the turbine blade 3 and supplies compressed air to the engine, and a rotary shaft 7 in which one end part thereof is connected with the turbine blade 3 and the other end part is connected with the compressor blade 5. In addition, the turbocharger 1 includes a turbine housing 9 internally accommodating the turbine blade 3, a compressor housing (not shown because it is detached in this embodiment) internally accommodating the compressor blade 5, and a bearing housing 8 inside which bearings 8a and 8b supporting the rotary shaft 7 are incorporated.

The turbine housing 9 is provided with a scroll flow passageway 9a through which a fluid (exhaust gas from the engine) used to rotationally drive the turbine blade 3 flows.

In addition, a circular-annular shaped turbine flange 10 is formed in a part of the turbine housing 9 close to the bearing housing 8. A circular-annular shaped bearing flange 11 (flange) is outwardly formed in a part of the bearing housing 8 close to the turbine housing 9. In each of the turbine flange 10 and the bearing flange 11, an outer surface thereof, namely the opposite surface to the contacting surface (inner surface) contacting the other flange, is formed in a tapered shape so as to gradually approach the contacting surface (inner surface) as approaching outside from inside in the radial direction thereof. In other words, each of the turbine flange 10 and the bearing flange 11 is formed in a tapered shape in which the thickness (width) thereof in the opposing direction of the flanges gradually decreases outward from inside in the radial direction thereof.

In the bearing housing 8 and the turbine housing 9, the flanges (the turbine flange 10 and the bearing flange 11) thereof contact each other, and in this state, a coupling member 2 holds the outer surfaces of the flanges together, and thereby the bearing housing 8 and the turbine housing 9 are connected to each other.

As shown in FIG. 1B, the coupling member 2 includes a pair of semicircular-arc members 2a separated from each other, and is formed in a ring shape. The pair of semicircular-arc members 2a are rotatably connected to each other through a rotary shaft 2b provided on one end parts of the semicircular-arc members 2a, and the other end parts thereof are fastened to each other using a bolt 2c and a nut 2d. As shown in FIG. 1A, a groove portion 2e is formed in the inner circumferential surface of the semicircular-arc member 2a in the circumferential direction thereof. The semicircular-arc member 2a holds the outer surfaces of the turbine flange 10 and of the bearing flange 11 together in a state where the turbine flange 10 and the bearing flange 11 contacting each other are disposed inside the groove portion 2e. The internal surfaces of the groove portion 2e facing each other are formed in a tapered shape corresponding to the outer surfaces of the turbine flange 10 and of the bearing flange 11.

Figure 2:
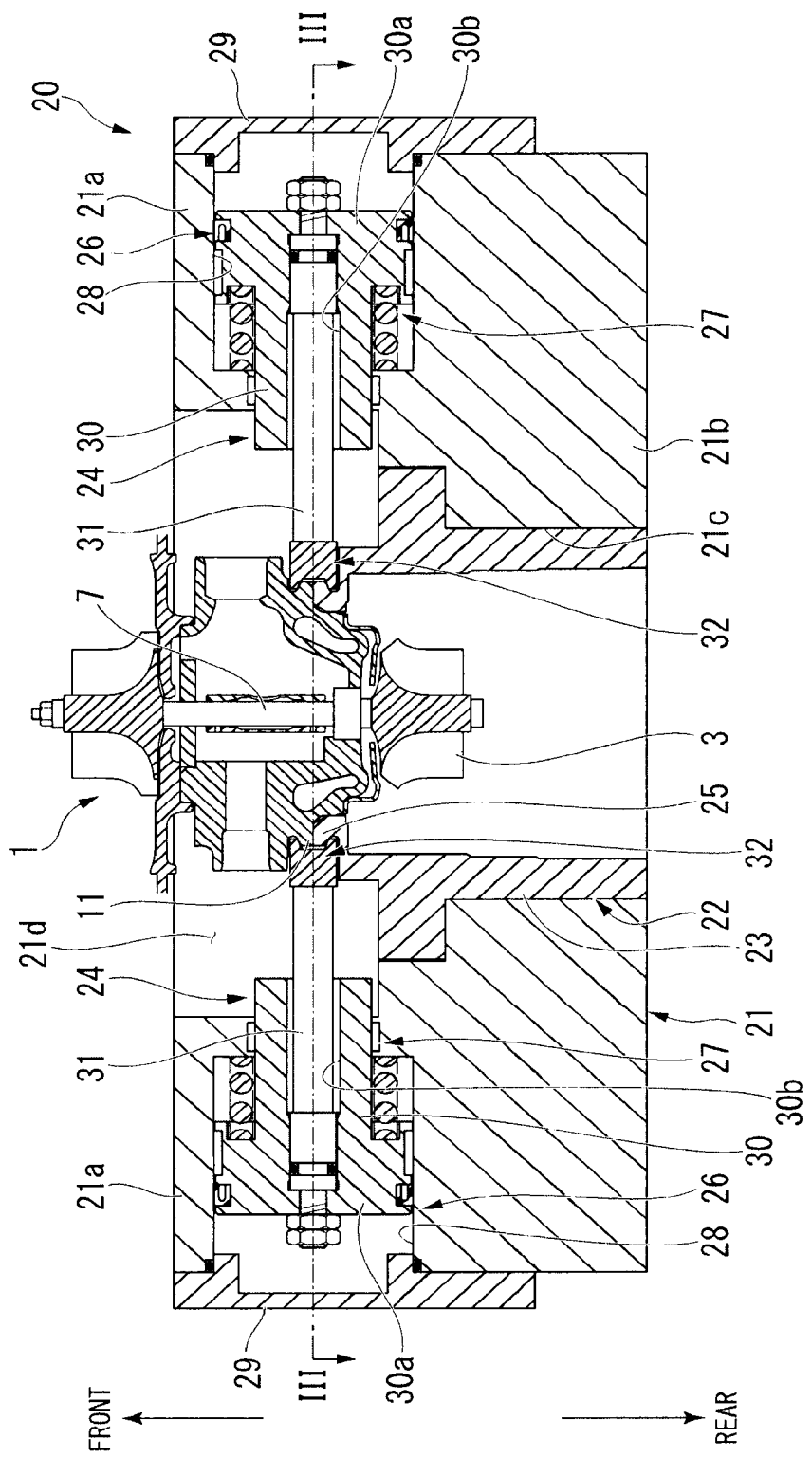
FIG. 2 is a cross-sectional plan view showing a first embodiment of the rotary machine support device of the present disclosure.
Figure 3:
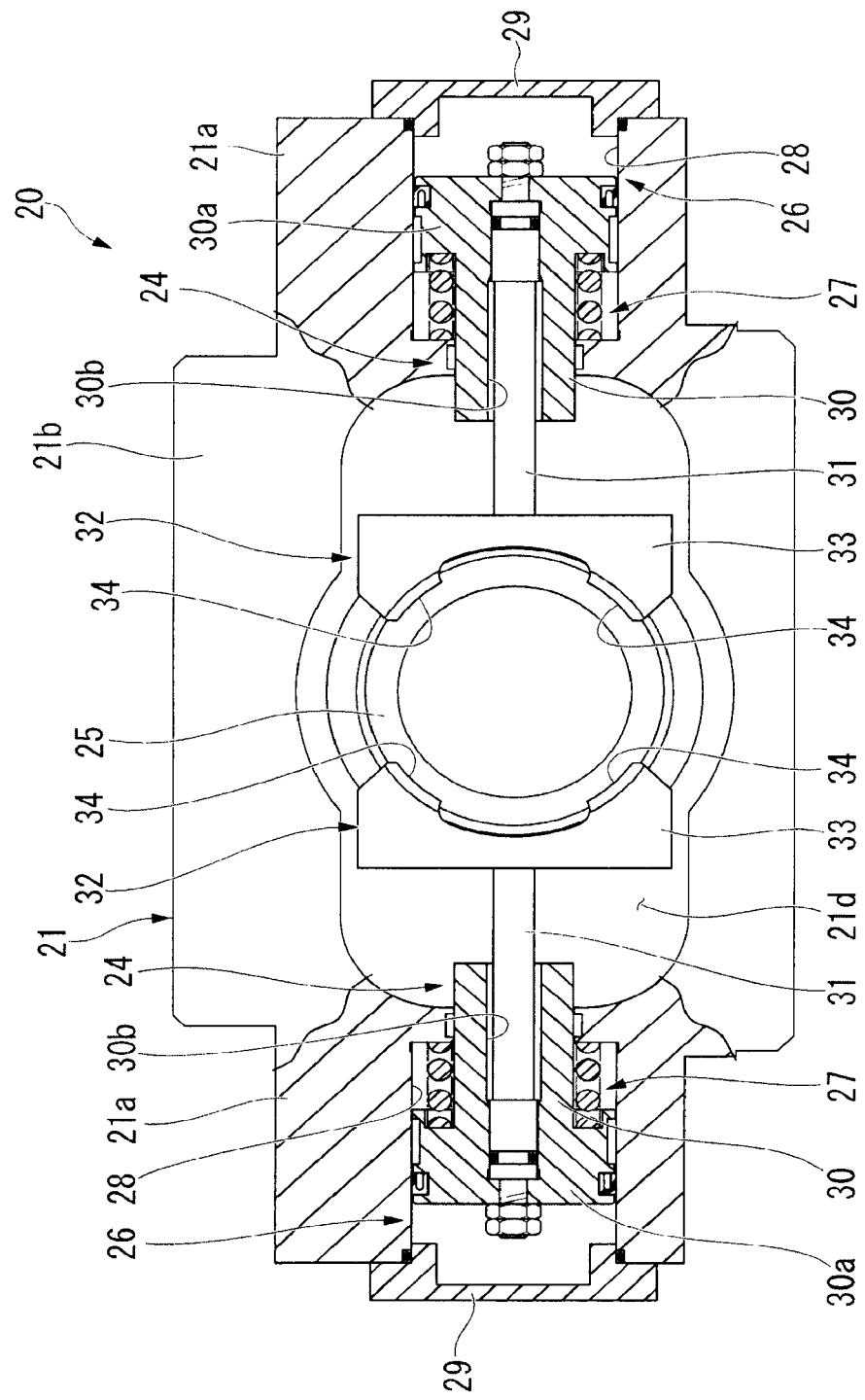
FIG. 3 is a partially cross-sectional front view of the rotary machine support device.
Figure 4:
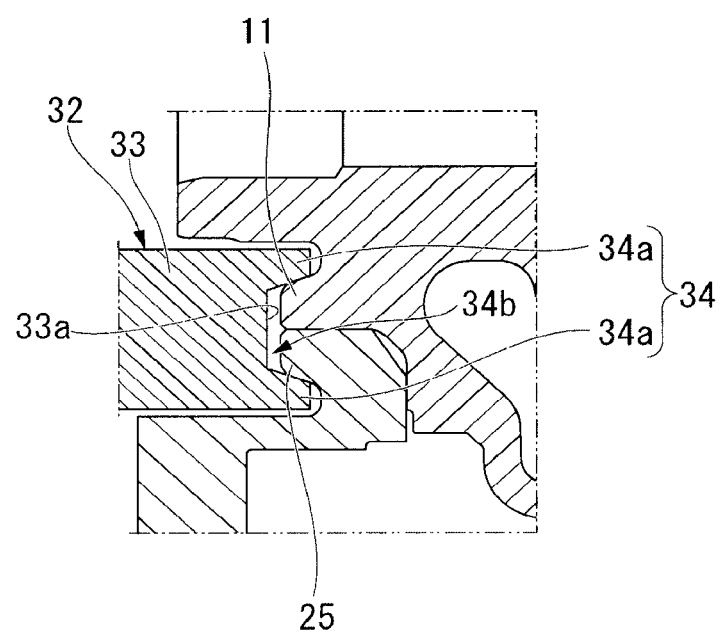
FIG. 4 is an enlarged view of a main section of FIG. 2.

FIGS. 2 to 4 are views showing a first embodiment of the rotary machine support device of the present disclosure. FIG. 2 is a cross-sectional plan view, FIG. 3 is a partially cross-sectional front view, and FIG. 4 is an enlarged view of a main section of FIG. 2. The parts shown in cross section in FIG. 3 are cross sections taken along line in FIG. 2. As shown in FIGS. 2 to 4, a rotary machine support device 20 is provided in a rotation balance inspection device (not shown) which performs the rotation balance inspection of the turbocharger 1. The rotary machine support device 20 is a support device which attachably and detachably supports the turbocharger 1 when the rotation balance inspection is performed.

In addition, the turbocharger 1, from which the turbine housing 9 and the compressor housing are removed, is mounted on the rotary machine support device 20. Accordingly, in the following description, the structure, in which the above two housings are removed from the turbocharger 1, may be referred to as the "turbocharger 1" for the sake of convenience.

As shown in FIG. 2, the rotary machine support device 20 includes a mount 21 provided on a support base (not shown), and a support portion 22 attached to the mount 21.

The mount 21 is formed in an approximately rectangular parallelepiped, and has a recessed portion 21d which is formed in an approximately U-shape in the cross-sectional plan view shown in FIG. 2, that is, which can accommodate the turbocharger 1 being an inspection target. The mount 21 includes a pair of side portions 21a facing each other across the recessed portion 21d, and a central portion 21b connecting the side portions 21a. A through-hole 21c is formed in the central portion 21b. The inner diameter of the through-hole 21c is formed to be smaller than that of the opening of the recessed portion 21d, and the through-hole 21c communicates with the recessed portion 21d.

The support portion 22 includes a mounting portion 23 on which the turbocharger 1 is mounted in a state where the turbine blade 3 of the turbocharger 1 is accommodated in the mounting portion 23, and a pair of arms 24 which hold and fix the turbocharger 1 in a state where the turbocharger 1 is mounted on the mounting portion 23.

Additionally, in the following description, a side of the mount 21 in which the recessed portion 21d is formed is referred to as the "front side", and another side of the mount 21 in which the through-hole 21c is formed is referred to as the "rear side".

The mounting portion 23 is an approximately cylindrical member which is fitted into the through-hole 21c formed in the mount 21. The mounting portion 23 is provided with a mounting flange 25 at the front end part of the mounting portion 23 (the end part on the front side thereof in FIG. 2), and can accommodate a flow passageway member (not shown) at the inside of the internal hole of the mounting portion 23. The mounting flange 25 is formed in approximately the same shape as the turbine flange 10 of the turbocharger 1 shown in FIG. 1A, and as shown in FIG. 4, can contact the bearing flange 11 of the turbocharger 1 which corresponds to the flange of the present disclosure.

The outer surface of the mounting flange 25, namely the surface thereof facing the through-hole 21c (the surface on the rear side thereof in FIG. 2), is formed in a tapered shape similar to the turbine flange 10. That is, the outer surface of the mounting flange 25 is formed in a tapered shape so as to gradually approach a contacting surface (inner surface) of the mounting flange 25 contacting the bearing flange 11 as approaching outside from inside in the radial direction of the mounting flange 25. In other words, the mounting flange 25 is formed in a tapered shape so that the thickness (width) of the tapered shape in the opposing direction (the front and rear direction in FIG. 2) of the bearing flange 11 and the mounting flange 25 gradually decreases outward from inside in the radial direction thereof.

The inner surface of the mounting flange 25 is formed in a flat surface through machining or the like. Therefore, the above inner surface can stably and closely contact the bearing flange 11 without a gap when butting on the hearing flange 11.

The flow passageway member (not shown), which is accommodated inside the internal hole of the mounting portion 23 shown in FIG. 2, has a similar structure to the turbine housing 9 shown in FIG. 1A, and includes a flow passageway similar to the scroll flow passageway 9a of the turbine housing 9. The flow passageway member having the above structure allows a fluid such as air to flow therethrough toward the turbine blade 3, the fluid being used to rotationally drive the turbine blade 3 shown in FIG. 2.

As shown in FIGS. 2 and 3, the arms 24 are provided in the side portions 21a of the mount 21. The pair of arms 24 are arranged so as to face the front end part of the mounting portion 23, namely the side surface of the mounting flange 25 (the surface on radially outside thereof). The pair of arms 24 are disposed so that the mounting flange 25 is inserted therebetween. Each of the arms 24 includes a hydraulic cylinder (an advancing and retracting mechanism) having a cylinder portion 26 formed in the side portion 21a of the mount 21 and a piston portion 27 capable of advancing and retracting inside the cylinder portion 26.

The cylinder portion 26 has a hole 28 formed from the side surface of the side portion 21a of the mount 21 toward the front end part (the recessed portion 21d) of the through-hole 21c. The opening of the hole 28 at the above side surface is liquid-tightly sealed with a cover plate 29. The cover plate 29 is attachably and detachably attached to the mount 21 using bolts or the like.

The piston portion 27 is formed including an outer cylindrical portion 30 having a cylindrical shape with a bottom, and a piston arm 31 inserted in the outer cylindrical portion 30. In the outer cylindrical portion 30, a bottom part 30a thereof disposed to be close to the side surface of the mount 21, namely to the cover plate 29, is formed having a large diameter so as to slide inside the hole 28. In addition, the outer circumferential part of the bottom part 30a is provided with a seal ring, and thereby the contact part between the bottom part 30a and the inner surface of the hole 28 is configured to be liquid-tight. Furthermore, a part of the outer cylindrical portion 30 closer to the forward end of the outer cylindrical portion 30 (closer to the recessed portion 21*d*) than the bottom part 30*a* is formed having a diameter less than that of the bottom part 30*a*. The outer cylindrical portion 30 is formed in a cylindrical shape, and the column-shaped piston arm 31 is inserted in an internal hole 30*b* of the outer cylindrical portion 30 having a circular cross section.

In the internal hole 30*b*, a part thereof close to the bottom part 30*a* is formed having a small diameter, and another part thereof close to the forward end of the bottom part 30*a* is formed having a large diameter. That is, in the internal hole 30*b*, a part thereof close to the bottom part 30*a* is a small diameter part, and another part thereof close to the forward end is a large diameter part having a diameter greater than the small diameter part.

The backward end part (the end part close to the bottom part 30*a*) of the piston arm 31 is fitted into the above small diameter part of the internal hole 30*b*, and is fastened by a bolt from the outer surface (the surface close to the cover plate 29) of the bottom part 30*a*. In addition, the forward end part (the end part close to the mounting flange 25) of the piston arm 31, namely the part of the piston arm 31 other than the above backward end part, is disposed inside the large diameter part of the internal hole 30*b*, so that a predetermined gap is formed between the forward end part and the inner surface of the large diameter part. The piston arm 31 is formed of metal, resin or the like having resilience, and is slightly resiliently deformable in a direction orthogonal to the extending direction thereof In the piston arm 31 having the above structure, the forward end part thereof is resiliently deformable inside the internal hole 30*h* of the outer cylindrical portion 30, and thus is configured to be a free end in which the position thereof can freely change within the range allowed by the gap formed between the forward end part and the inner surface of the internal hole 30*b*. While allowing the deformation of the piston arm 31, the outer cylindrical portion 30 can prevent large deformation thereof. In addition, the piston arm 31 has a rigidity sufficient to add a desired pressing force (described below) to the mounting flange 25.

A holding portion 32 is attached to the forward end part of the piston arm 31. As shown in FIGS. 3 and 4, the holding portion 32 includes a support plate 33 attached to the piston arm 31, and claw parts 34 formed on the support plate 33.

As shown in FIG. 3, a forward end surface 33*a* of the support plate 33 (the surface facing the mounting flange 25) is formed in an approximately arc shape, and the approximately arc-shaped forward end surface 33*a* is provided with the claw parts 34. The arc shape of the forward end surface 33*a* of the support plate 33 is formed to he slightly greater than the arc corresponding to one fourth of the circle formed of the outline of the mounting flange 25 or of the bearing flange 11.

The arc-shaped claw parts 34 are formed on two sides (two sides in the circumferential direction) of the arc-shaped forward end surface 33*a*. The claw parts 34 are formed and arranged on the forward end surface 33*a* of the support plate 33 so that the length on the support plate 33 between the centers of the claw parts 34, namely the distance in the circumferential direction between the centers (the centers in the circumferential direction) of the claw parts 34, is approximately equivalent to the length of the arc corresponding to one fourth of the circle formed of the outline of the mounting flange 25 or of the bearing flange 11. Therefore, four claw parts 34 in total formed on the piston arms 31 of the pair of arms 24 disposed facing each other are arranged on the circular outline of the mounting flange 25 or of the bearing flange 11 at approximately regular intervals in the circumferential direction. Additionally, in this way, since the claw parts 34 are formed and arranged on the forward end surface 33*a* of the support plate 33 so that the length on the support plate 33 between the centers of the claw parts 34 is approximately equivalent to the length of the arc corresponding to one fourth of the circle formed of the outline of the mounting flange 25 or of the bearing flange 11, as described above, the arc shape of the forward end surface 33*a* of the support plate 33 is set to be slightly greater than the arc corresponding to one fourth of the circle formed of the outline of the mounting flange 25 or of the bearing flange 11.

As shown in FIG. 4, the claw part 34 includes a pair of claw pieces 34*a* facing each other, and is configured to hold the mounting flange 25 and the bearing flange 11 together between the claw pieces 34*a*. The pair of claw pieces 34*a* face each other in a direction parallel to the opposing direction of the mounting flange 25 and the bearing flange 11. One claw piece 34*a* is provided on an edge (the edge on the upper side of FIG. 4) of the forward end surface 33*a* of the support plate 33, and the other claw piece 34*a* is provided on another edge (the edge on the lower side of FIG. 4) of the forward end surface 33*a* of the support plate 33.

The inner surfaces of the claw pieces 34*a*, namely the inner surfaces used to hold the mounting flange 25 and the hearing flange 11, are formed in a tapered shape corresponding to the tapered shape of the outer surfaces of the mounting flange 25 and the bearing flange 11. That is, the inner surfaces of the claw pieces 34*a* are formed such that the separation between the inner surfaces gradually increases from the backward end (the end close to the support plate 33) to the forward end of the claw piece 34*a*. In other words, the inner surface of the claw piece 34*a* is formed such that the separation between the inner surface of the claw piece 34*a* and the inner surface of the mounting flange 25 or of the bearing flange 11 contacting the claw piece 34*a* gradually increases from the backward end to the forward end of the claw piece 34*a*.

In further other words, a groove portion 34*b* formed between the pair of claw pieces 34*a* is formed in a tapered shape, and this tapered shape is formed so that the width (the width in the upper and lower direction in FIG. 4) of the tapered shape in the opposing direction of the mounting flange 25 and the bearing flange 11 gradually decreases outward from inside in the radial direction of the mounting flange 25.

The claw part 34 of the holding portion 32 having the above structure holds the mounting flange 25 and the hearing flange 11 together while adding a pressing force to the outer circumferential parts (the parts on radially outside) of the mounting flange 25 and the bearing flange 11 contacting each other inward from outside in the radial direction as described below, and thereby it is possible to change the above pressing force into a pressing force in the axial direction thereof, namely the axial direction of the rotary shaft 7 (the above opposing direction), through the tapered shape of the inner surfaces of the claw pieces 34*a* or through the tapered shape of the outer surfaces of the mounting flange 25 and the bearing flange 11.

When the mounting flange 25 and the bearing flange 11 are inserted into the groove portion 34*b* formed between the pair of claw pieces 34*a*, and the outer surfaces of the mounting flange 25 and the bearing flange 11 are brought into contact with the inner surfaces of the pair of claw pieces 34*a*, the claw part 34 is configured so that a gap is formed between the forward end surface 33*a* of the support plate 33 and the outer circumferential surfaces (the surfaces on radially outside) of the mounting flange 25 and of the bearing flange 11 (refer to FIG. 4). If in this state, the holding portion 32 further presses the mounting flange 25 and the bearing flange 11 inward from outside in the radial direction thereof, the mounting flange 25 and the bearing flange 11 receive a pressure from the inner surfaces of the pair of claw pieces 34a, namely a pressing force in the axial direction of the rotary shaft 7 (in the opposing direction of the mounting flange 25 and the bearing flange 11), and are further tightly held in the opposing direction thereof In addition, as described above, the four claw parts 34 in total are formed on the piston arms 31 of the pair of arms 24, and are arranged on the circular outline of the mounting flange 25 or the bearing flange 11 at approximately regular intervals in the circumferential direction. Therefore, it is possible to press the circular mounting flange 25 and the circular bearing flange 11 uniformly in the circumferential direction without deviation in pressing force, and to stably hold the flanges.

The cylinder portion 26 is connected with an oil supply portion (not shown) which supplies oil or the like into the hole 28 positioned to be closer to the cover plate 29 than the bottom part 30a of the outer cylindrical portion 30 of the piston portion 27, and with an oil discharge portion (not shown) which discharges oil from the hole 28. In addition, a part between the bottom part 30a of the outer cylindrical portion 30 of the piston portion 27 and the forward end (the opening on the opposite side to the cover plate 29) of the hole 28 is connected with an air import and export portion (not shown) which imports and exports air. Furthermore, a part between the bottom part 30a of the outer cylindrical portion 30 of the piston portion 27 and the forward end (the opening on the opposite side to the cover plate 29) of the hole 28 is provided with a pushing member such as a coil spring, and the pushing member pushes the bottom part 30a toward the cover plate 29.

The cylinder portion 26 and the piston portion 27 having the above configuration compose an advancing and retracting mechanism being a hydraulic cylinder, and the piston arm 31 of the piston portion 27 can be advanced and retracted through driving of the advancing and retracting mechanism. Accordingly, the claw part 34 of the holding portion 32 is configured to advance toward the mounting flange 25 and the bearing flange 11 through driving of the advancing and retracting mechanism, and to hold the flanges. In addition, the claw part 34 is configured to release the holding of the holding portion 32 on the flanges by the claw part 34 retracting from the above state. The oil supply portion supplies oil into the hole 28, and thereby the piston portion 27 and the piston arm 31 are advanced. The oil discharge portion discharges oil from the inside of the hole 28, and the pushing member pushes the bottom part 30a, and thereby the piston portion 27 and the piston arm 31 are retracted.

In the pair of arms 24 arranged facing each other, one oil supply portion may be used in common. In this case, in the two advancing and retracting mechanisms being hydraulic cylinders, the insides of the holes 28 positioned to be closer to the cover plates 29 than the bottom parts 30a of the outer cylindrical portions 30 of the piston portions 27 can have the same oil pressure. Thus, it is possible to prevent a state where one of the pair of arms 24 strongly presses the mounting flange 25 and the bearing flange 11 and the other thereof weakly presses the flanges, and the pair of arms 24 can uniformly press the flanges.

When the rotary machine support device 20 having the above configuration supports the turbocharger 1, first, a rotary unit is prepared in which a rotor composed of the turbine blade 3, the compressor blade 5 and the rotary shaft 7 is attached to the bearing housing 8.

On the other hand, in the rotary machine support device 20, the mounting portion 23 is attached to the mount 21, and the flow passageway member (not shown) is attached to the mounting portion 23. At this time, the advancing and retracting mechanisms (hydraulic cylinders) of the pair of arms 24 are not driven, and the holding portions 32 are in a state of being retracted.

Next, the turbine blade 3 is inserted into the through-hole 21c of the mount 21 through the opening of the front end (the end on the front side in FIG. 2) thereof, and the bearing flange 11 of the bearing housing 8 is brought into a state of contacting the mounting flange 25. In this state, the advancing and retracting mechanisms (hydraulic cylinders) of the pair of arms 24 are driven, and the holding portions 32 are advanced toward the mounting flange 25.

The holding portions 32 advance toward the outer circumferential parts of the mounting flange 25 and the bearing flange 11 contacting each other, press the mounting flange 25 and the bearing flange 11 inward from outside in the radial direction thereof through the claw parts 34 as shown in FIG. 4, and hold the flanges together. At this time, since a pressing force of the claw part 34 (the holding portion 32) inward from outside in the radial direction is changed into a pressing force in the axial direction (the opposing direction) through the tapered shape as described above, the bearing flange 11 can be brought into tight and close contact with the mounting flange 25.

The forward end part of the piston arm 31 is resiliently deformable inside the outer cylindrical portion 30, and is configured to be a free end in which the position thereof can freely change. Therefore, when the holding portion 32 (the claw parts 34) attached to the forward end of the piston arm 31 advances toward and contacts the mounting flange 25 and the bearing flange 11, the holding portion 32 (the claw parts 34) can automatically adjust (change) the position thereof so as to further appropriately hold the flanges. Consequently, it is possible to appropriately hold the mounting flange 25 and the bearing flange 11 by the pair of claw parts 34, in detail between the claw pieces 34a as shown in FIG. 4 without deviation in pressing force.

As described above, the forward end part of the piston arm 31 of the arm 24 is resiliently deformable inside the outer cylindrical portion 30, and thus is configured to be a free end in which the position thereof can freely change. Therefore, the holding portion 32 is configured so that the position thereof is capable of changing in each of a direction around the axis of the piston arm 31 (the arm 24), a direction orthogonal to the rotary shaft 7 (the upper and lower direction in FIG. 3, the direction being orthogonal to the above opposing direction), and the direction (the axial direction of the rotary shaft 7, namely the opposing direction) orthogonal to a surface direction (a direction parallel to the inner surface) of the mounting flange 25 and the bearing flange 11. Thus, as described above, the position of the holding portion 32 (the claw parts 34) is automatically adjusted in accordance with the position of the mounting flange 25 and the bearing flange 11, and it is possible to further appropriately hold the flanges.

In the rotary machine support device 20, the holding portion 32 holds the bearing flange 11 of the turbocharger 1 together with the mounting flange 25. Therefore, even if various kinds of projection is formed in the vicinity of the bearing flange 11 of the turbocharger 1, the holding of the holding portion 32 is not interfered by the projection. Thus, even if the projection is provided on any position, all models of rotary machine can be accepted and supported thereby without reference to the position of the projection. Consequently, it is possible to limit the increase in cost of the rotation balance inspection and to simplify the inspection.

The piston portion 27 of the arm 24 is formed of the outer cylindrical portion 30 and the piston arm 31, and the forward end part of the piston arm 31 is configured to be resiliently deformable by forming a gap between the forward end part and the inner surface of the outer cylindrical portion 30. Therefore, the resiliently deformable part of the piston arm 31 can be sufficiently long, and thereby the deformation amount thereof due to resilient deformation can be sufficiently large.

In a case where the piston portion is configured of only one rod similarly to a normal hydraulic cylinder without adopting the double structure composed of the outer cylindrical portion 30 and the piston arm 31, two parts, namely the backward end part and the forward end part, of the piston portion are supported by the cylinder portion. Therefore, only the part of the piston portion projecting from the cylinder portion becomes the resiliently deformable part. However, if the part of the piston portion projecting from the cylinder portion is formed to be sufficiently long, the entire length of the arm is increased, the rotary machine support device 20 is increased in size, and the footprint or weight thereof may be increased.

In contrast, according to this embodiment, the piston portion 27 has the double structure composed of the outer cylindrical portion 30 and the piston arm 31 as described above. Therefore, the entire length of the arm can be limited, and thus the rotary machine support device 20 can be prevented from increasing in size, and the deformation amount of the piston arm 31 due to resilient deformation can be sufficiently large.

Figure 5:
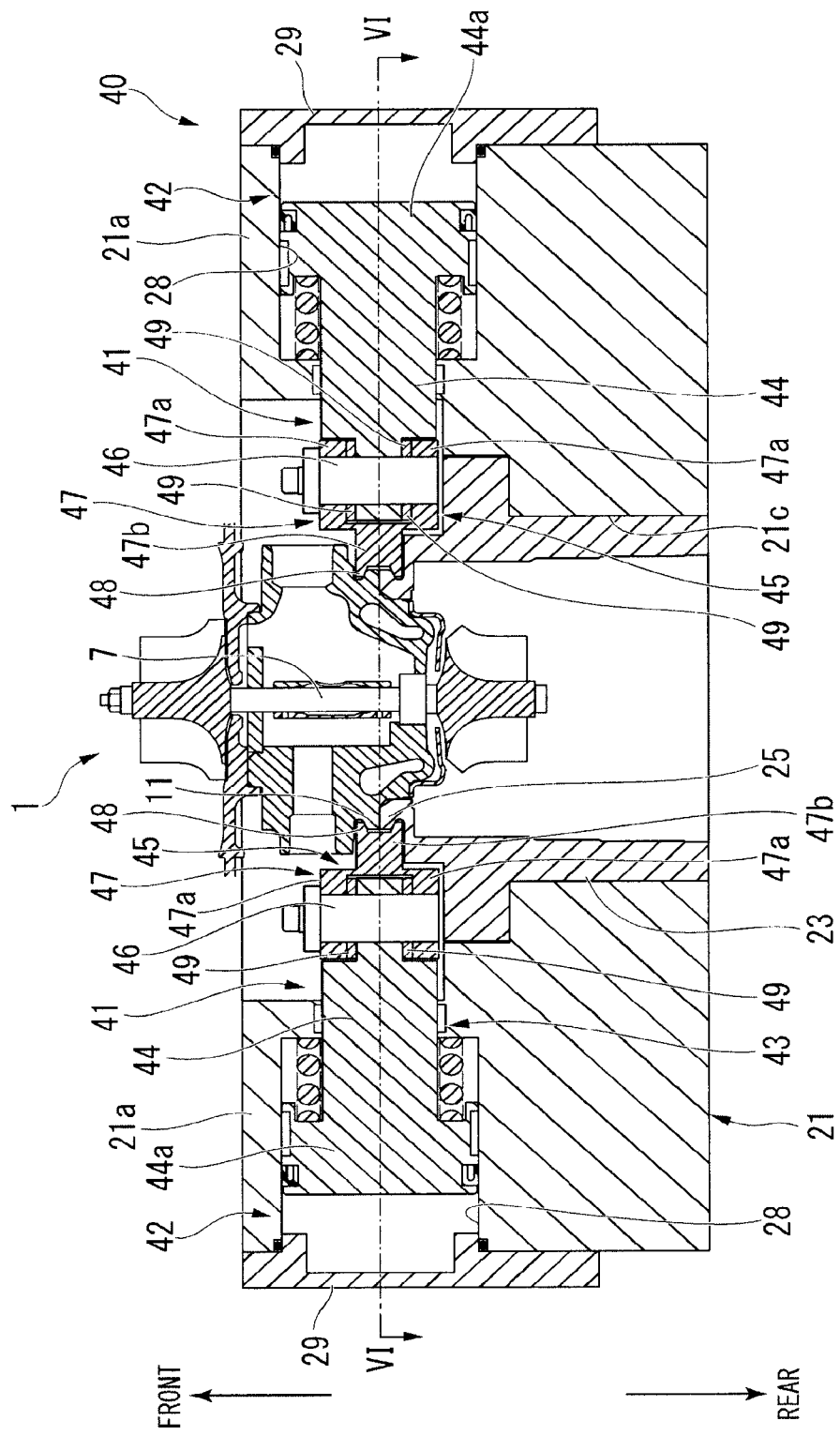
FIG. 5 is a cross-sectional plan view showing a second embodiment of the rotary machine support device of the present disclosure.
Figure 6:
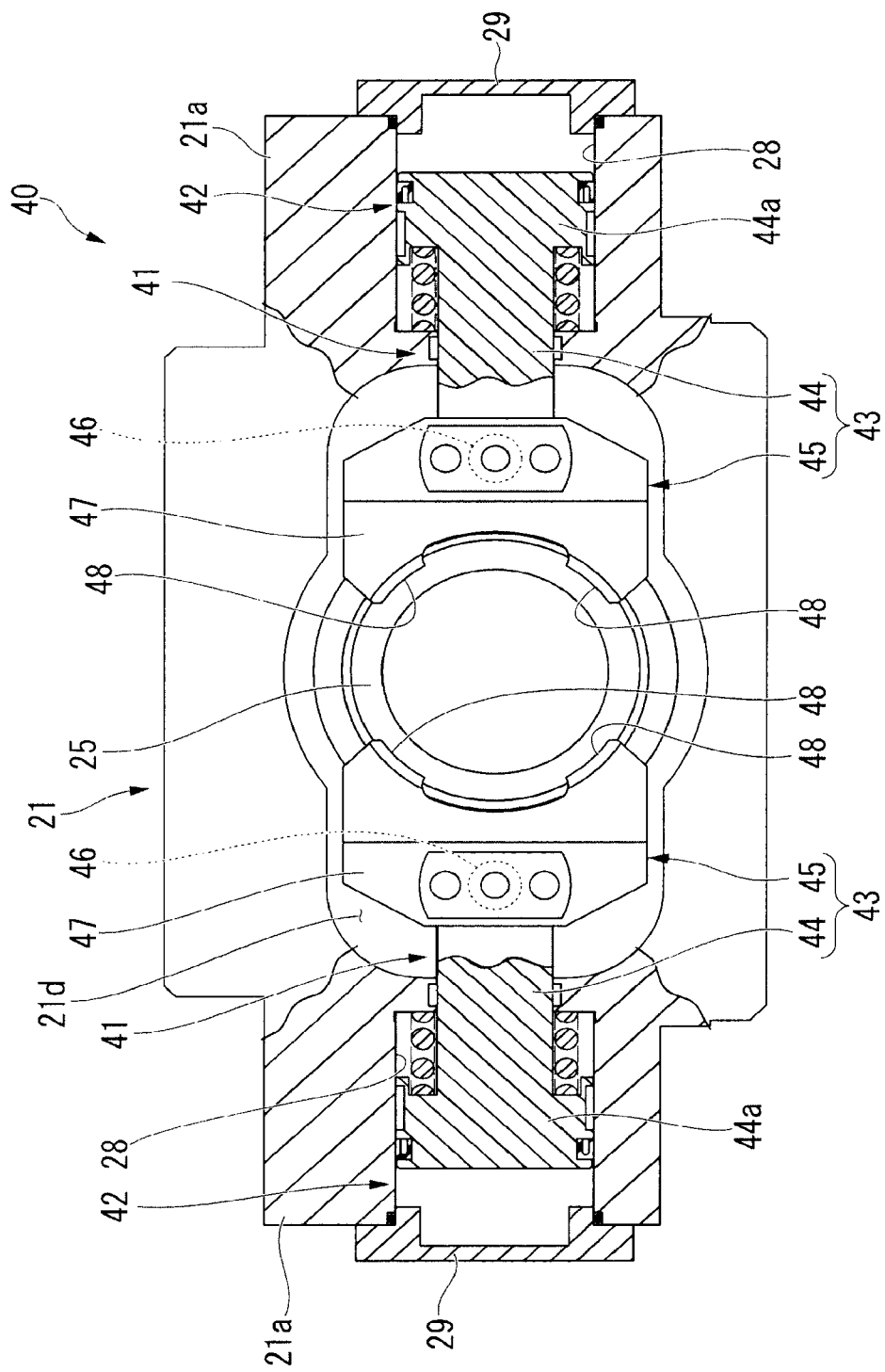
FIG. 6 is a partially cross-sectional front view of the rotary machine support device.

FIGS. 5 and 6 are views showing a second embodiment of the rotary machine support device of the present disclosure. FIG. 5 is a cross-sectional plan view, and FIG. 6 is a partially cross-sectional front view. The portions shown in cross section in FIG. 6 are cross sections taken along VI-VI line in FIG. 5. A rotary machine support device 40 shown in FIGS. 5 and 6 is different from the rotary machine support device 20 shown in FIGS. 2 to 4, in the specific configuration of an arm.

As shown in FIGS. 5 and 6, a pair of arms 41 of the rotary machine support device 40 of this embodiment are also arranged facing the front end of the mounting portion 23, namely the side parts of the mounting flange 25. Each of the arms 41 also includes a hydraulic cylinder (advancing and retracting mechanism) composed of a cylinder portion 42 formed in each of the side portions 21a of the mount 21 and of a piston portion 43 which advances and retracts inside the cylinder portion 42.

The cylinder portion 42 has the same structure as that of the cylinder portion 26 of the arm 24 of the first embodiment, and has a hole 28 formed from the side surface of the side portion 21a of the mount 21 toward the front end of the through-hole 21c.

The piston portion 43 includes a piston arm 44 and a holding portion 45 attached to the forward end part of the piston arm 44. In the piston arm 44, a bottom part 44a thereof disposed close to the side surface of the mount 21, namely to the cover plate 29, is formed having a large diameter so as to slide inside the hole 28. In addition, the outer circumferential part of the bottom part 44a is provided with a seal ring, and thereby the contact part between the bottom part 44a and the inner surface of the hole 28 is configured to be liquid-tight. Furthermore, the part of the piston arm 44 closer to the forward end thereof than the bottom part 44a is formed having a diameter less than that of the bottom part 44a. The piston arm 44 is arranged inside the hole 28 of the cylinder portion 42 so as to be rotatable around the central axis of the piston arm 44.

The holding portion 45 includes a support plate 47 rotatably attached to the forward end part of the piston arm 44 through a rotary shaft 46, and claw parts 48 formed on the forward end surface of the support plate 47. The rotary shaft 46 is arranged extending in a direction parallel to the extending direction of the rotary shaft 7, namely to the opposing direction of the bearing flange 11 and the mounting flange 25. As shown in FIG. 5, the support plate 47 is composed of a pair of first plates 47a arranged so that the forward end part of the piston arm 44 is inserted therebetween, and of a second plate 47b connecting the first plates 47a.

The rotary shaft 46 is made to penetrate the first plates 47a and the piston arm 44 in a state where the forward end part of the piston arm 44 is inserted between the pair of first plates 47a, and thereby the support plate 47 is rotatably attached to the piston arm 44. In addition, a resilient member 49 such as rubber is provided between each first plate 47a and the piston arm 44. In this way, the support plate 47 is configured so that the position thereof is capable of being changed in the length direction (the above opposing direction) of the rotary shaft 46 with respect to the forward end part of the piston arm 44.

The forward end surface of the support plate 47, namely the forward end surface of the second plate 47b, is formed in an approximately arc shape similarly to the support plate 33 of the first embodiment, and the claw parts 48 are formed on the approximately arc-shaped forward end surface. The arc shape of the forward end surface of the support plate 47 is also formed to be slightly greater than the arc corresponding to one fourth of the circle formed of the outline of the mounting flange 25 or of the hearing flange 11, similarly to the support plate 33.

The claw parts 48 having an arc shape are formed on two sides (two sides in the circumferential direction) of the forward end surface having an arc shape. The claw parts 48 have the same structure and arrangement as that of the claw parts 34 of the first embodiment. That is, the claw part 48 includes a pair of claw pieces facing each other and is configured to hold the mounting flange 25 and the bearing flange 11 together between the claw pieces, similarly to the claw part 34 shown in FIG. 4.

The inner surfaces of the claw pieces of the claw parts 48, namely the inner surfaces used to hold the mounting flange 25 and the bearing flange 11, are formed in a tapered shape corresponding to the tapered shape of the outer surfaces of the mounting flange 25 and the bearing flange 11, similarly to the claw pieces 34a of the first embodiment.

Therefore, when the claw part 48 of this embodiment holds the mounting flange 25 and the bearing flange 11 together while adding a pressing force to the outer circumferential parts of the contacting flanges inward from outside in the radial direction, the tapered shape of the inner surfaces of the claw pieces or the tapered shape of the outer surfaces of the mounting flange 25 and the bearing flange 11 can change the above pressing force into a pressing force in the axial direction, namely in the axial direction of the rotary shaft 7.

The cylinder portion 42 is connected with an oil supply portion, with an oil discharge portion, and with an air import and export portion which imports and exports air, similar to those of the first embodiment. In addition, a pushing member is provided therein, and thereby the bottom part 44a of the piston arm 44 is pushed toward the cover plate 29.

The cylinder portion 42 and the piston portion 43 (the piston arm 44) having the above structure compose an advancing and retracting mechanism being a hydraulic cylinder, and are configured to advance and retract the piston arm 44 of the piston portion 43. Thus, the claw part 48 of the holding portion 45 is configured to advance toward the mounting flange 25 and the bearing flange 11 through driving of the advancing and retracting mechanism, and to hold the flanges. In addition, the claw part 48 is configured to release the holding of the holding portion 45 on the flanges by the claw part 48 retracting from the above state.

In addition, one oil supply portion may also be used in common in the advancing and retracting mechanisms being hydraulic cylinders of the pair of arms 41 of this embodiment. In this case, the pair of arms 41 can uniformly press the mounting flange 25 and the bearing flange 11.

When the rotary machine support device 40 having the above configuration supports the turbocharger 1, the turbocharger 1 can also be supported similarly to the first embodiment.

That is, the turbine blade 3 is inserted into the through-hole 21c of the mount 21 through the opening thereof, and the bearing flange 11 of the bearing housing 8 is brought into a state of contacting the mounting flange 25. In this state, the advancing and retracting mechanisms (hydraulic cylinders) of the pair of arms 41 are driven, and the holding portions 45 are advanced.

The holding portions 45 advance toward the outer circumferential parts of the mounting flange 25 and the bearing flange 11 contacting each other, and the claw parts 48 press the mounting flange 25 and the bearing flange 11 inward from outside in the radial direction thereof similarly to the first embodiment, thereby holding the flanges together. At this time, since a pressing force of the claw part 48 (the holding portion 45) inward from outside in the radial direction is changed into a pressing force in the axial direction through the tapered shape as described above, the bearing flange 11 can be brought into tight and close contact with the mounting flange 25.

In the arm 41, the forward end part of the piston arm 44 is configured to be a free end in which the position thereof can freely change. Therefore, when the holding portion 45 (the claw parts 48) attached to the forward end of the piston arm 44 advances toward the mounting flange 25 and the bearing flange 11 and contacts the flanges, the holding portion 45 (the claw parts 48) can automatically adjust (change) the position thereof so as to further appropriately hold the flanges. Consequently, it is possible to appropriately hold the mounting flange 25 and the bearing flange 11 by the pair of claw parts 48, in detail between the claw pieces as shown in FIG. 4 without deviation in pressing force.

That is, since the piston arm 44 is rotatable inside the cylinder portion 42, the position of the holding portion 45 can change in a direction around the central axis of the piston arm 44 (the arm 41).

In addition, since the holding portion 45 is rotatably attached to the piston arm 44 through the rotary shaft 46, the position of the holding portion 45 can change in a direction around the central axis of the rotary shaft 46. In other words, the holding portion 45 is configured so that the position thereof is capable of changing in a direction approximately orthogonal to the rotary shaft 7 (the direction being along an arc coaxial with the rotary shaft 46, and being approximately parallel to a direction orthogonal to the rotary shaft 7). That is, the position of the holding portion 45 is capable of changing in a direction approximately orthogonal to the rotary shaft 7 (the upper and lower direction in FIG. 6, the direction being approximately orthogonal to the above opposing direction). Furthermore, since the holding portion 45 is attached to the piston arm 44 through the resilient members 49, the position of the holding portion 45 is capable of changing in the direction orthogonal to a surface direction of the mounting flange 25 and the bearing flange 11 (the axial direction of the rotary shaft 7, the above opposing direction). Thus, as described above, the position of the holding portion 45 (the claw parts 48) is automatically adjusted in accordance with the position of the mounting flange 25 and the bearing flange 11, and it is possible to further appropriately hold the flanges.

In the rotary machine support device 40, the holding portion 45 holds the bearing flange 11 of the turbocharger 1 together with the mounting flange 25. Therefore, even if various kinds of projection is formed in the vicinity of the bearing flange 11 of the turbocharger 1, the holding using the holding portion 45 is not interfered by the projection. Thus, even if the projection is provided on any position, all models of rotary machine can be accepted and supported thereby without reference to the position of the projection. Consequently, it is possible to limit the increase in cost of the rotation balance inspection and to simplify the inspection.

Figure 7:
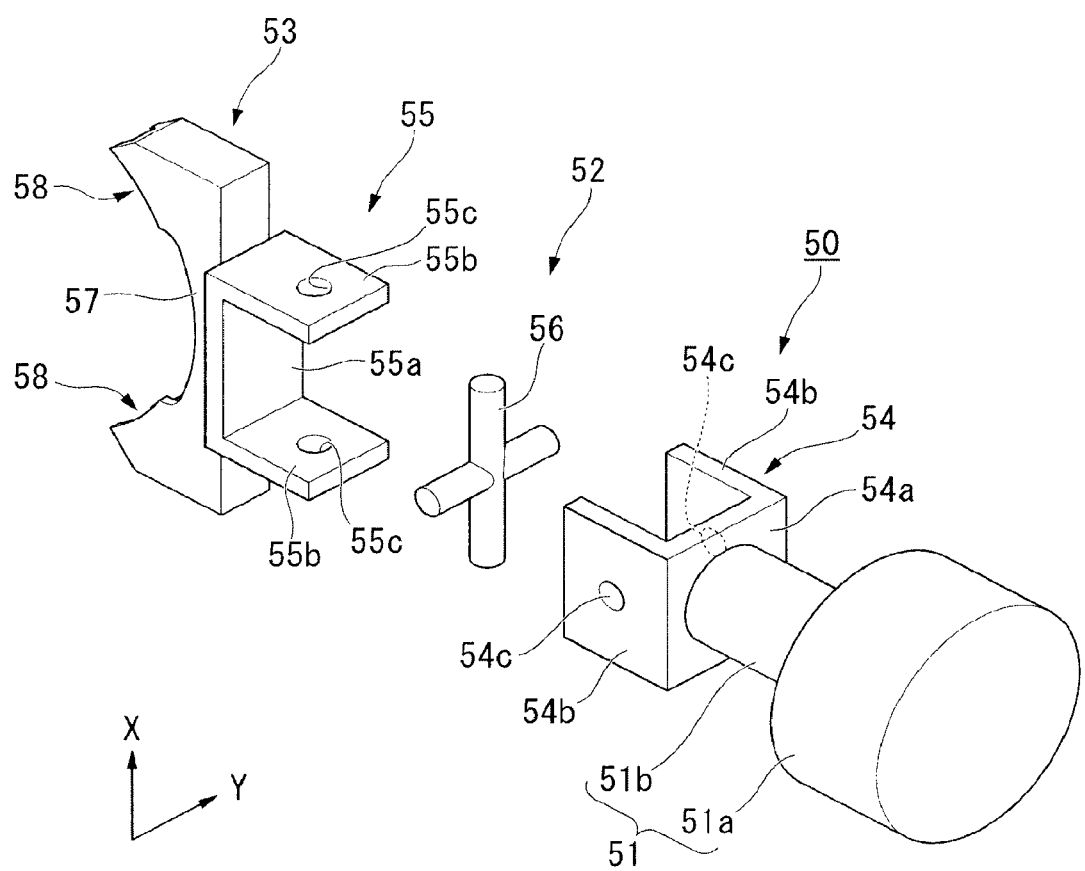
FIG. 7 is a diagram showing a third embodiment of the rotary machine support device of the present disclosure, and is an exploded perspective view showing a schematic configuration of an arm.

FIG. 7 is a view showing a third embodiment of the rotary machine support device of the present disclosure, and is an exploded perspective view showing a schematic configuration of an arm. The third embodiment is different from the second embodiment, in the specific configuration of a piston portion of an arm.

As shown in FIG. 7, a piston portion 50 of this embodiment has a universal joint-type structure, and includes a piston body 51, a joint portion 52, and a holding portion 53. The piston body 51 is a member similar to the piston arm 44 shown in FIGS. 5 and 6, and includes a column-shaped bottom part 51a and a column-shaped rod 51b having a smaller diameter than that of the bottom part 51a. The outer circumferential part of the bottom part 51a is also provided with a seal ring similarly to the first and second embodiments.

The joint portion 52 includes a first joint 54 attached to the forward end of the piston body 51 (the forward end of the rod 51b), a second joint 55 attached to the holding portion 53, and a shaft member 56 connecting the first and second joints 54 and 55. The first joint 54 includes a base plate 54a attached to the forward end of the piston body 51 (the rod 51b) and a pair of side plates 54b provided projecting from two ends of the base plate 54a, and is formed in an approximately U-shape in plan view. A connecting hole 54c is formed in each of the side plates 54b.

The second joint 55 includes a base plate 55a and a pair of side plates 55b, and is formed in an approximately U-shape in plan view, similarly to the first joint 54. A connecting hole 55c is formed in each of the side plates 55b. The first and second joints 54 and 55 are arranged so that the side plates 54b and the side plates 55b project in the opposite direction to each other, and so that the position of the side plates 54b and the position of the side plates 55b are different from each other by 90° around the central axis of the piston body 51. In addition, the length of the base plate 55a between the side plates 55b of the second joint 55 is set to be greater than the length of the base plate 54a of the first joint 54 in the extending direction of the side plate 54b (the extending direction of the connecting edge between the base plate 54a and the side plate 54b). Therefore, when the joint portion 52 is assembled, the contact between the side plates 55b of the second joint 55 and the side plates 54b of the first joint 54 is prevented.

The shaft member 56 has a shape in which two column-shaped shafts are united in crisscross, and four ends are inserted in the connecting holes 54c of the side plates 54b of the first joint 54 and in the connecting holes 55c of the side plates 55b of the second joint 55. In this way, the first and second joints 54 and 55 are connected to each other through the shaft member 56. In addition, the position of the second joint 55 is capable of changing in the length direction of each shaft of the shaft member 56, namely in each of the X-direction and the Y-direction in FIG. 7, and furthermore is also capable of changing in the direction around each shaft of the shaft member 56. The Y-direction is parallel to the extending direction of the rotary shaft 7 (refer to FIG. 5). Additionally, in view of assembling of the joint portion 52, the two shafts of the shaft member 56 may be configured to be capable of being separated from each other.

The holding portion 53 is integrally attached to the base plate 55a of the second joint 55, and has a structure similar to the holding portion 32 shown in FIGS. 2 to 4. The holding portion 53 is formed including a support plate 57 which has an approximately arc-shaped forward end surface and is attached to the base plate 55a, and arc-shaped claw parts 58 formed on two sides (two sides in the circumferential direction) of the forward end surface of the support plate 57. The claw part 58 is formed including a pair of claw pieces facing each other similarly to the holding portion 32.

The piston portion 50 having the above structure is inserted in the cylinder portion 42 shown in FIGS. 5 and 6, namely in the hole 28, so as to be capable of advancing and retracting, and thereby an advancing and retracting mechanism being a hydraulic cylinder is configured. In addition, the piston portion 50 is disposed inside the hole 28 rotatably around the central axis thereof.

Therefore, a rotary machine support device including the piston portion 50 can also support the turbocharger 1 similarly to the first and second embodiments.

The forward end part of the piston portion 50 included in the arm is configured to be a free end in which the position thereof can freely change, similarly to the first and second embodiments. In addition, the arm of this embodiment is capable of more freely moving than the arm 41 of the second embodiment. Accordingly, when the holding portion 53 (the claw parts 58) attached to the forward end of the piston portion 50 advances toward the mounting flange 25 and the bearing flange 11 and contacts the flanges, the holding portion 53 (the claw parts 58) can automatically adjust (change) the position thereof so as to further appropriately hold the flanges. Consequently, it is possible to appropriately hold the mounting flange 25 and the bearing flange 11 by the pair of claw parts 58, in detail between the claw pieces as shown in FIG. 4 without deviation in pressing force.

That is, since the piston body 51 is rotatable inside the cylinder portion 42 around the central axis thereof, the position of the holding portion 53 can change in a direction around the central axis of the piston body 51 (arm).

In addition, since the second joint 55 is configured so that the position thereof is capable of changing in a direction around an axis parallel to the Y-direction with respect to the first joint 54 through the shaft member 56, the holding portion 53 is configured so that the position thereof is capable of changing in a direction approximately orthogonal to the rotary shaft 7 (refer to FIG. 5) (the direction being along an arc around the axis parallel to the Y-direction, and being approximately parallel to a direction orthogonal to the rotary shaft 7). Furthermore, since the second joint 55 is configured so that the position thereof is capable of changing in the Y-direction with respect to the first joint 54 through the shaft member 56, the holding portion 53 is configured so that the position thereof is capable of changing in the direction (the extending direction of the rotary shaft 7) orthogonal to a surface direction of the mounting flange 25 and the bearing flange 11.

In addition to these configurations, since the second joint 55 is configured so that the position thereof is capable of changing in each of the X-direction and a direction around an axis parallel to the X-direction with respect to the first joint 54 through the shaft member 56, as described above, the position of the holding portion 53 (the claw parts 58) is automatically adjusted in accordance with the position of the mounting flange 25 and the bearing flange 11, and it is possible to further appropriately hold the flanges.

In the rotary machine support device including the piston portion 50, the holding portion 53 holds the bearing flange 11 of the turbocharger 1 together with the mounting flange 25. Therefore, even if various kinds of projection is formed in the vicinity of the bearing flange 11 of the turbocharger 1, the holding using the holding portion 53 is not interfered by the projection. Thus, even if the projection is provided on any position, all models of rotary machine can be accepted and supported thereby without reference to the position of the projection. Consequently, it is possible to limit the increase in cost of the rotation balance inspection and to simplify the inspection.

The present disclosure is not limited to the above embodiments, and various modifications can be adopted within the scope of and not departing from the gist of the present disclosure.

Figure 8A:
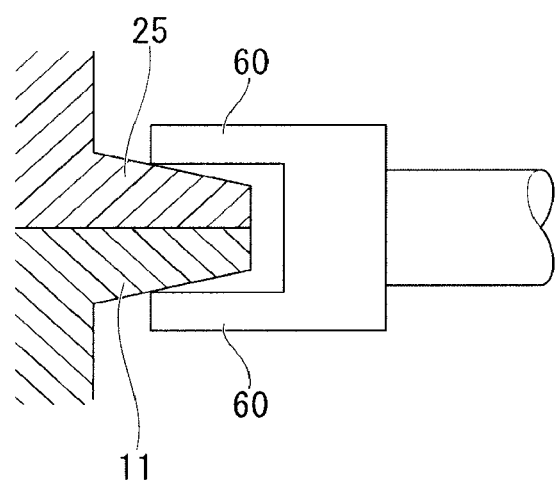
FIG. 8A is a diagram showing a modification of the present disclosure.

For example, in the above embodiments, the outer surface of the mounting flange 25 is formed in a tapered shape similarly to the outer surface of the bearing flange 11, and the inner surfaces of the claw pieces of the claw part of each holding portion of the pair of arms are also formed in a tapered shape corresponding to the outer surfaces of the mounting flange 25 and the bearing flange 11. However, the present disclosure is not limited to this configuration, and as shown in FIG. 8A, only the outer surface of the mounting flange 25 may be formed in a tapered shape similarly to the outer surface of the bearing flange 11, and the inner surfaces of claw pieces 60 of a claw part may not be formed in a tapered shape but in a flat shape (the shape parallel to the radial direction of the flanges). In addition, although the entire mounting flange 25 is formed in a tapered shape in FIG. 8A, a part of the mounting flange 25 and the vicinity of the part may be formed in a tapered shape, and the part contacts the pair of claw pieces 60 when the mounting flange 25 and the bearing flange 11 are inserted between the pair of claw pieces 60.

Figure 8B:
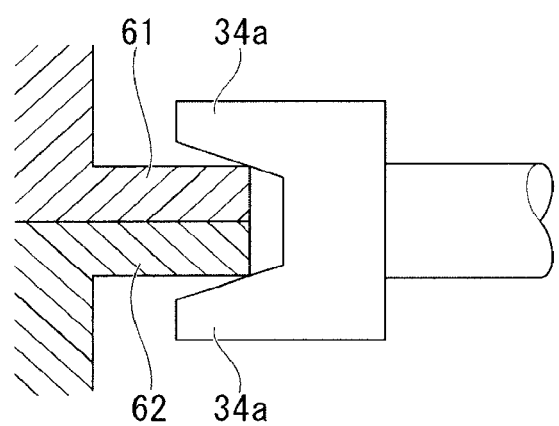
FIG. 8B is a diagram showing a modification of the present disclosure.

As shown in FIG. 8B, only the inner surfaces of claw pieces 34a of a claw part may be formed in a tapered shape, and the outer surfaces of a mounting flange 61 and of a bearing flange 62 may not be formed in a tapered shape but in a flat shape (the shape parallel to the radial direction of the flanges). In addition, although the entire claw pieces 34a are formed in a tapered shape in FIG. 8B, parts of the claw pieces 34a and the vicinity of the parts may be formed in a tapered shape, and the parts contact the mounting flange 61 and the bearing flange 62 when the mounting flange 61 and the bearing flange 62 are inserted between the pair of claw pieces 34a.

Even if one of an outer surface of a flange and an inner surface of a claw piece (one of a mounting flange and a groove portion formed between a pair of claw pieces) is formed in a tapered shape in the above way, a claw part adds a pressing force to the mounting flange 25 (61) and the bearing flange 11 (62) inward from outside in the radial direction thereof and holds the flanges together, and thus the tapered shape can change the pressing force into a pressing force in the axial direction thereof.

In the above embodiments, two claw parts are formed in each of a pair of arms, and thus four claw parts in total are arranged on the circular outline of the mounting flange 25 and the bearing flange 11 at approximately regular intervals in the circumferential direction thereof. However, for example, the number of claw parts which hold the mounting flange 25 and the bearing flange 11 may be three, or five or more. In a case where the number of claw parts is three, for example, in one of a pair of arms, the length of an arc-shaped support plate in which claw parts are formed is increased, and two claw parts are formed on two sides of the support plate. In contrast, the other arm is provided with one claw part. The three claw parts are arranged on the circular outline of the mounting flange 25 and the bearing flange 11 at approximately regular intervals in the circumferential direction thereof. In this way, it is possible to uniformly hold the circular mounting flange 25 and the circular bearing flange 11 without a deviation in pressing force.

Furthermore, a configuration may be adopted in which a plurality of arms whose number is three or more are provided therein, and one claw part (holding portion) is formed in each arm.

In the above embodiments, the bearing flange and the mounting flange are formed in a circular-annular shape. However, the present disclosure is not limited to this configuration, the flange may be formed in an elliptic shape, a polygonal shape or the like in plan view. In addition, if the flange is formed in a non-circular shape and it is difficult to determine the radial direction thereof, the radial direction described in the above embodiments and the claims of the present application may be used for the projecting direction of the flange.

In the above embodiments, the extending direction of the rotary shaft 7 and a surface direction of the flange (the direction parallel to the inner surface of the flange) are orthogonal to each other. However, the present disclosure is not limited to this configuration, and the extending direction of the rotary shaft 7 and a surface direction of the flange may non-orthogonally cross each other.

In the above embodiments, although a rotary machine support device of the present disclosure is applied to a device which supports a turbocharger (rotary machine) when the rotation balance inspection is performed on the turbocharger, the present disclosure can be applied to a device other than the support device for the rotation balance inspection. In addition, the present disclosure can be applied to a device which supports a rotary machine other than a turbocharger.

INDUSTRIAL APPLICABILITY

The present disclosure can be applied to a rotary machine support device for supporting a rotary machine which includes a bearing housing and a rotary shaft, the bearing housing having a flange.

The invention claimed is:

1. A rotary machine support device for supporting a rotary machine which includes a bearing housing and a rotary shaft, the bearing housing including a flange formed outward, the rotary shaft being rotatably held inside the bearing housing, the rotary machine support device comprising:
a support portion which supports the rotary machine,
wherein the support portion includes:
a mounting flange capable of contacting the flange of the rotary machine; and
a plurality of arms, each arm including a holding portion which is configured to hold the mounting flange and the flange together while pressing the mounting flange and the flange inward from outside in a radial direction of the mounting flange in a state where the mounting flange contacts the flange,
the holding portion includes a pair of claw pieces which face each other and which are capable of holding the mounting flange and the flange together, and
at least one of the mounting flange and a groove portion which is formed between the pair of claw pieces is formed in a tapered shape, and the tapered shape is formed so that a width of the tapered shape in an opposing direction of the flange and the mounting flange gradually decreases outward from inside in the radial direction of the mounting flange.

2. The rotary machine support device according to claim 1,
wherein the holding portion is provided on an end of the arm so that the position of the holding portion is capable of changing in each of a direction around an axis of the arm, a direction orthogonal to the opposing direction, and the opposing direction.

3. The rotary machine support device according to claim 2,
wherein the arm includes an advancing and retracting mechanism having a cylinder portion and a piston portion capable of advancing and retracting inside the cylinder portion,
the piston portion includes an outer cylindrical portion having a cylindrical shape with a bottom, and a piston arm inserted in the outer cylindrical portion,
the piston arm, in which a gap is formed between an end part of the piston arm and an inner surface of the outer cylindrical portion, is configured to be resiliently deformable, and
an end of the piston arm is provided with the pair of claw pieces.

4. The rotary machine support device according to claim 1,
wherein the arm includes an advancing and retracting mechanism having a cylinder portion and a piston portion capable of advancing and retracting inside the cylinder portion,
the piston portion includes an outer cylindrical portion having a cylindrical shape with a bottom, and a piston arm inserted in the outer cylindrical portion,
the piston arm, in which a gap is formed between an end part of the piston arm and an inner surface of the outer cylindrical portion, is configured to be resiliently deformable, and
an end of the piston arm is provided with the pair of claw pieces.

* * * * *